Jan. 17, 1956  N. J. GARRETT  2,730,816
ROSARY DEVICE
Filed Oct. 23, 1952

INVENTOR.
NORMAN J. GARRETT
BY
Oldham & Oldham
ATTORNEYS

United States Patent Office 2,730,816
Patented Jan. 17, 1956

2,730,816
ROSARY DEVICE
Norman J. Garrett, Akron, Ohio
Application October 23, 1952, Serial No. 316,383
7 Claims. (Cl. 35—23)

The invention relates to rosaries, and especially to a rosary device which is in a small container adapted to be carried in the pocket.

Normally rosaries, of course, are made in the form of relatively large loops of beads and they are somewhat cumbersome to carry and to use, especially if one wanted to use the rosary in a crowded public place like a street car or bus. Some attempts have been made heretofore to provide small articles for use as rosaries, with such articles being less cumbersome than the usual rosary beads. However, insofar as I am aware, none of such prior devices have been completely satisfactory for one or more reasons.

The general object of the present invention is to provide a compact rosary device which is easily carried and from which a complete rosary can be said.

Another object of the invention is to provide an attractive appearing article of small size, which article is especially adapted for use as a rosary device.

Yet another object of the invention is to provide an attractive packaged article in which a plurality of beads are positioned on the periphery of a rotatable wheel and with the beads being individually exposed so that a rosary can be said therefrom.

The foregoing and other objects and advantages of the invention will be made more apparent as the specification proceeds.

In order to understand the present invention completely, reference should be had to the accompanying drawings wherein.

Figure 1:
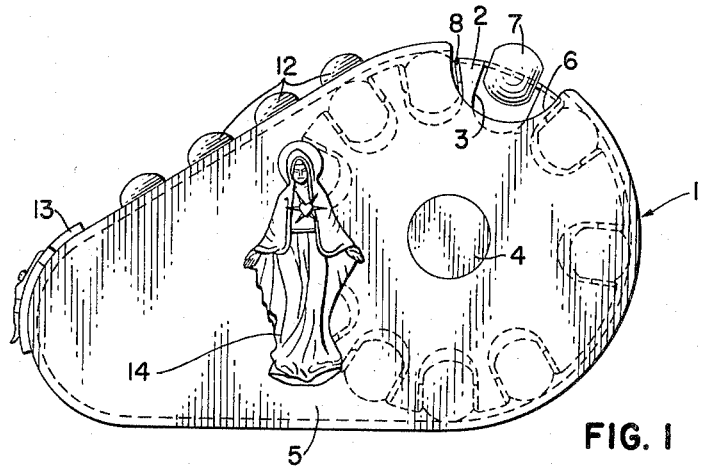
Fig. 1 is a side elevation of the rosary device of the invention.
Figure 6:
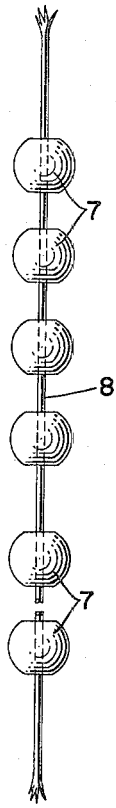
Fig. 6 is a fragmentary plan of some of the beads and the support cord used in the rosary device.
Figure 2:
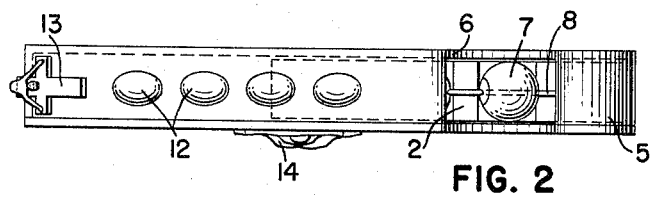
Fig. 2 is a plan of the rosary device of Fig. 1.
Figure 4:
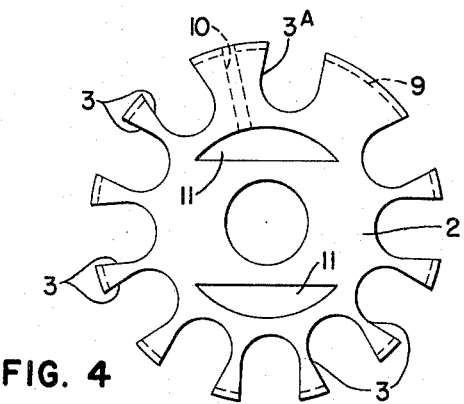
Fig. 4 is a side elevation of the wheel used in the rosary device of Fig. 1.

The invention relates to a rosary device wherein a wheel is provided for positioning eleven beads thereon in peripheral recesses in the wheel, a case is provided for rotatably positioning the wheel therein and an opening is formed in the case for individually exposing one of the beads in the case at one time. Preferably the beads are positioned in special spaced relation to each other so that it is easy to tell when the bead carrying wheel has been completely rotated, and preferably the beads are so positioned that they will spring up at least partially out of their carrying recesses when any bead on the wheel is exposed in the case opening.

With regard to the details of the structure shown in the several figures of the drawings, the rosary device of the invention is indicated as a whole by the numeral 1 and it includes a wheel 2 that is made of any suitable material and usually has a plurality of recesses 3 formed in its periphery. Inasmuch as the invention primarily relates to the provision of a rosary device, the wheel 2 is shown as having ten evenly spaced recesses provided therein whereas one recess 3$^a$ is non-uniformly spaced with relation to the other recesses and such recess 3$^a$ is shown as relatively widely spaced in both circumferential directions from the recesses 3. This recess 3$^a$ may be spaced different distances in different directions from the adjacent recesses 3. This special or dissimilar recess 3$^a$ thus may be larger than the other recesses if desired and have a larger bead positioned therein, if desired, or else the different spacing of such recess alone may be used to indicate a complete rotation of the wheel 2, as hereinafter described. The wheel 2 is positioned on a suitable shaft 4 that extends therethrough with such shaft 4 being journaled in a carrier case 5. This carrier case is of any suitable construction and normally snugly receives the wheel 2. A peripheral opening 6 is provided at one edge of the case 5 and the wheel 2 is so positioned that a portion of its periphery is adjacent to and exposed by the opening 6. A sufficient portion of the wheel 2 is exposed to aid in rotating the wheel in the case.

Figure 3:
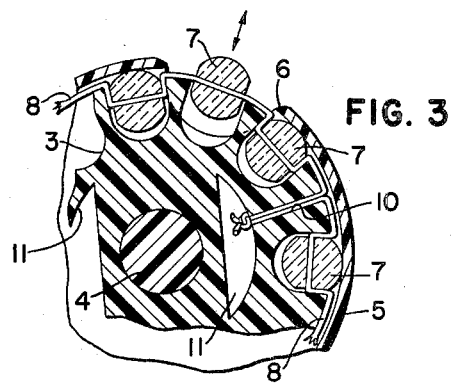
Fig. 3 is a fragmentary vertical section through the rosary device of Figs. 1 and 2.
Figure 5:
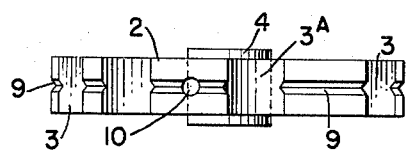
Fig. 5 is a plan of the wheel of Fig. 4.

As an important element of the rosary device of the invention, a bead 7 is positioned in each of the recesses 3 and 3$^a$ and such beads are secured together and to the wheel 2 by a resilient member or cord means, such as an elastic cord 8. Figs. 1 and 3 of the drawing indicate that the interior of the case 5 usually is of such size as to snugly receive the wheel 2 and retains the beads 7 in their carrier recesses in the portion of the wheel within the casing and adjacent the opening 6.

Figs. 1 and 3 best show that the elastic cord 8 normally springs or forces the exposed bead 7 from its recess but such exposed bead may readily be manually forced back into its associated recess as the wheel is rotated, and such bead is no longer exposed at the opening 6. Preferably the wheel 2 is provided with a groove 9 extending circumferentially thereof on its periphery for receiving the cord 8 intermediate the recesses 3. The elastic cord 8 may be anchored by use of a radially extending bore 10 through which both ends of the cord 8 extend and with such cord 8 and bore 10 extending to a passageway or aperture 11 formed in the wheel 2 and usually extending therethrough in an axial direction. Thus the ends of the cord 8 may be knotted in the aperture 11 to aid in securing the beads in position on the wheel.

As another important feature of the invention, the case 5 preferably positions four-half beads 12 thereon in alignment adjacent the opening 6. Furthermore, a crucifix 13 is also secured to the case 5 so that a complete rosary can be said by using the device. That is, the crucifix and the stationary beads on the case 5 may first have the appropriate prayers said thereon and then the wheel 2 can be rotated five times with appropriate prayers being said to represent the endless loop portion of the normal rosary beads.

As yet another attractive portion of the rosary device, usually a figure of Our Lady of Fatima, as shown at 14, is secured to one or both sides of the case 5. This case 5 is relatively small in size and can be easily carried whereas the complete rosary can readily be said therefrom so that the objects of the invention are achieved.

While one complete embodiment of the invention has been disclosed herein, it will be appreciated that modification of this particular embodiment of the invention may be resorted to without departing from the scope of the invention as defined by the appended claims.

Having thus described my invention, what I claim is:

1. A rosary device comprising a wheel having ten equally spaced peripheral recesses therein and one other peripheral recess therein spaced different circumferential distances in different directions from said ten recesses, a case in which said wheel is positioned, a bead positioned in each said recess, said case having an open portion therein, means journaling said wheel in said case with a portion of the periphery of said wheel being exposed at said open portion, and resilient means securing said beads on said wheel in the recesses, said case retaining said beads in said recesses except for any bead positioned at said open portion, a bead positioned at said open portion being moved at least partially out of said recess by said resilient means.

2. A rosary device comprising a wheel having a plurality of peripheral recesses therein, a case in which said wheel is positioned, a bead being positioned in each said recess, said case having an open portion therein, means journaling said wheel in said case with a portion of the periphery of said wheel being exposed at said open portion, and resilient means securing said beads together and to said wheel, said case retaining said beads in said recesses except for any one bead positioned at said open portion, a bead positioned at said open portion being moved at least partially out of said recess by said resilient means, said wheel having a radially directed bore extending from its periphery to a passage extending through said wheel, said resilient means extending through said bore and being secured in said passage.

3. A rosary device comprising a wheel having a plurality of peripheral recesses therein, a case in which said wheel is positioned, a bead positioned in each said recess, said case having an open portion therein, means journaling said wheel in said case with a portion of the periphery of said wheel being exposed at said open portion, said open portion being of a circumferential length to expose substantially only one bead at a time, and resilient means positioning each bead in its recess, a bead positioned at said open portion being moved at least partially out of said recess by said resilient means, the inside of the case engaging with the remaining beads to hold them in the recesses against the action of the resilient means.

4. A rosary device as in claim 3 wherein four beads and a crucifix are secured to said case in alignment with each other and adjacent said open portion in said case, and in the plane of the beads on the wheel.

5. A rosary device comprising a wheel having a plurality of peripheral recesses therein, a case in which said wheel is positioned, a bead being positioned in each said recess, said case having an open portion therein, means journaling said wheel in said case with a portion of the periphery of said wheel being exposed at said open portion, and resilient means securing said beads together and to said wheel.

6. A rosary device comprising a wheel having ten equally spaced peripheral recesses therein and one other peripheral recess therein spaced different circumferential distances in different directions from said ten recesses, a case in which said wheel is positioned, a bead positioned in each said recess, said case having an open portion therein, means journaling said wheel in said case with a portion of the periphery of said wheel being exposed at said open portion, and resilient means securing said beads together and to said wheel, said wheel having a radially directed bore extending from its periphery to a passage extending through said wheel, said resilient means extending through said bore and being secured in said passage.

7. A rosary device comprising a wheel having a plurality of peripheral recesses therein, said wheel having ten similar peripheral recesses therein and an additional dissimilar peripheral recess therein, a case in which said wheel is positioned, a bead being positioned in each said recess, said case having an open portion therein, means journaling said wheel in said case with a portion of the periphery of said wheel being exposed at said open portion, and cord means securing said beads together and to said wheel.

References Cited in the file of this patent

UNITED STATES PATENTS

| | | |
|---|---|---|
| 1,000,026 | Lewis | Aug. 8, 1911 |
| 1,109,378 | Ward | Sept. 1, 1914 |
| 1,661,877 | Costello | Mar. 6, 1928 |
| 2,461,130 | Szaj | Feb. 8, 1949 |
| 2,651,850 | Czeywicznik | Sept. 15, 1953 |

FOREIGN PATENTS

| | | |
|---|---|---|
| 479,171 | Canada | Dec. 11, 1951 |